United States Patent [19]

Frank

[11] 3,963,177

[45] June 15, 1976

[54] THERMOSTATIC CONTROL VALVE FOR A ONE-PIPE STEAM SYSTEM

[75] Inventor: Jamie Frank, Roslyn, N.Y.

[73] Assignee: Flair Manufacturing Corporation, Hauppauge, Long Island City, N.Y.

[22] Filed: Mar. 12, 1975

[21] Appl. No.: 557,727

[52] U.S. Cl. .................................. 236/37; 236/64
[51] Int. Cl.² .......................................... F28F 27/00
[58] Field of Search ..................... 236/37, 63–66; 237/9 R

[56] References Cited
UNITED STATES PATENTS

| | | | |
|---|---|---|---|
| 2,300,962 | 11/1942 | Pratt | 237/9 X |
| 2,401,025 | 5/1946 | Smith | 236/37 |
| 2,419,820 | 4/1947 | Chandler | 237/9 |
| 2,545,107 | 3/1951 | Peper | 236/64 X |

Primary Examiner—William E. Wayner
Assistant Examiner—William E. Tapolcai, Jr.
Attorney, Agent, or Firm—Burgess, Dinklage & Sprung

[57] ABSTRACT

A thermostatic control valve for a one-pipe steam system formed by the combination of a conventional vent valve and a temperature controlled valve for closing the flow passage into the vent valve at a pre-set ambient temperature. The temperature controlled valve is preferably in the form of a self-contained temperature responsive valve having a valve chamber with an inlet connection to a radiator of a one-pipe steam system and an outlet leading into the vent valve. A valve seat is provided between the inlet and the outlet and a valve member cooperates with the seat and is movably actuated through an arrangement controlled by a heat expansible fluid which may, if desired, be positioned in a remote bulb.

6 Claims, 2 Drawing Figures

U.S. Patent June 15, 1976 3,963,177
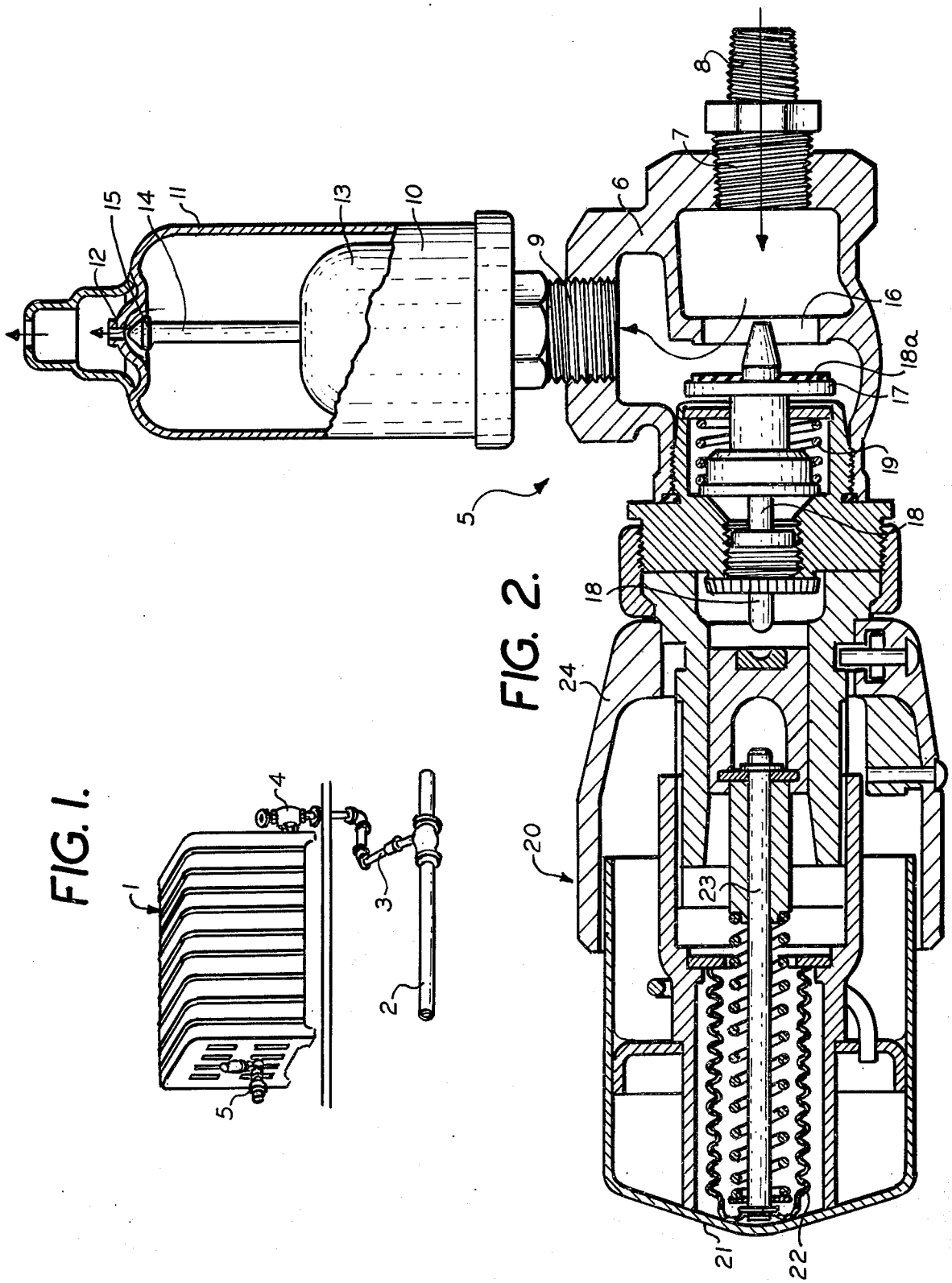

THERMOSTATIC CONTROL VALVE FOR A ONE-PIPE STEAM SYSTEM

This invention relates to a thermostatic control valve for a one-pipe steam system.

One-pipe steam systems have been used for many years for heating homes and other buildings or structures. In such systems a radiator is provided in the area to be heated. The term "radiator" as used herein is intended to generically designate not only the conventional radiators, but also convectors, baseboard type radiators, and the like. Steam is fed from the boiler to the radiator through a single pipe and condensate water must drain from the radiator through this same pipe.

In order to insure that the radiator will be filled with steam to perform its heating function, a vent valve is provided on the radiator generally at the opposite end from the inlet connection of the steam pipe. This vent valve is sometimes referred to as a "steam valve" and sometimes as an "air valve" and sometimes as a "quick vent," and serves the purpose of venting air from the radiator to allow the same to become filled with steam.

When steam is fed into the radiator, the vent valve remains open, allowing the steam to force the air out of the radiator through the vent valve. When the steam reaches the vent valve, its temperature causes expansion of a member which in turn causes the vent valve to shut, preventing a further venting of steam into the room or area where the radiator is situated. As the steam cools down and condenses in the radiator, the vent valve will cool, again open, and repeat its function with each call for heat.

Vent valves are of a well-known and conventional construction and are generally in the form of a vertical, cylindrical chamber having a vent port at the upper end which may be closed by a valve member positioned on a stem which is connected to a chamber which expands when heated by the steam, forcing the valve stem upwardly and, thus, closing the vent port. The chamber may be in the form of a float in order to prevent water discharge. Thus, if water should enter the cylindrical chamber, it can force the float to float upwardly, closing the vent port and preventing discharge of water.

Temperature control in one-pipe steam systems is effected by thermostatic control of the furnace and boiler operation, and individual radiators may be shut off manually by means of a radiator valve located at the inlet of the steam pipe into the radiator.

Past attempts to separately thermostatically control individual radiators or groups of radiators so as to provide, for example, zone control, have presented difficulties. In the main, these attempts involved providing a thermostatically controlled radiator valve. This, however, presented the problem that when the valve was shut, condensate water would accumulate in the radiator and could not drain back through the single pipe connection, causing, for example, noise and problems when the valve was reopened thermostatically.

One object of this invention is a very simple, economical and foolproof thermostatic control valve for a one-pipe steam system which avoids the above-mentioned disadvantages.

This and still further objects will become apparent from the following description read in conjunction with the drawings, in which:

FIG. 1 is a perspective view of a radiator of a one-pipe steam system incorporating a thermostatic control valve in accordance with the invention; and FIG. 2 is a side elevation, partially in vertical section, of an embodiment of a thermostatic control valve in accordance with the invention.

The thermostatic control valve of a one-pipe steam system in accordance with the invention comprises a vent valve of the conventional and well-known construction and a temperature control valve for closing the flow passage into this vent valve at a pre-set ambient temperature.

Referring to the embodiment shown in the drawings, and specifically referring to FIG. 1, 1 represents a conventional steam radiator for a one-pipe steam system. Steam is fed to the radiator from the supply main 2 fed by a boiler to the connection pipe 3 and manual radiator valve 4, all of which are conventional and well-known in the art.

While in the embodiment shown, the radiator is fed by what is known as an up-feed connection, it is understood that the same may be fed by any other conventional type of connection, such as an up or downfeed riser, downfeed connection with a wet return, or a downfeed connection with a condensation pump return, or the like. Furthermore, it is understood that in place of the conventional standing radiator 1, a baseboard radiator, convector, or the like, may be used.

In conventional operation, the steam as it passes from the main 2 to the pipe 3 and valve 4 into the radiator forces air out of a conventional vent valve until the steam reaches this valve at which point its temperature shuts the vent, preventing escape of steam. The steam heats the radiator which, in turn, transmits the same to the ambient atmosphere. Adjustment of the radiator should not be attempted by means of a radiator valve. This valve should always be open since throttling produces sputtering of condensate return as it encounters incoming steam. Adjustment in normal systems is effected by manipulation of the control thermostat setting. Individual radiators may be shut off with a radiator valve but should not be balanced.

In accordance with the invention, the radiator is provided with the thermostatic control valve 5, the details of which may best be seen from FIG. 2.

This valve is provided with a valve chamber 6, of brass, cast iron, or the like, having the inlet 7 which is connected to the radiator by the fitting nipple 8 where the vent valve is normally connected. The valve chamber 6 is provided at its upper end with the threaded outlet 9 into which is screwed the vent valve 10 of conventional construction. The vent valve 10 as shown has a cylindrical housing 11 provided at its upper end with a vent port and outlet 12. A hollow float 13 is positioned in the chamber 11 and provided at its upper end with a stem 14 on the end of which is positioned a valve member 15 for closing the vent port 12. According to its conventional function, as steam passes into the chamber 11, it heats the float 13 causing fluid or vapor in its interior to expand, pushing the stem 14 upwardly and sealing the vent port 12 with the valve member 15. If water enters the chamber 11, it will also cause the float 13 to rise, thus sealing the vent port 12 and preventing the discharge of water.

It is understood that this vent valve may have any known or conventional construction and that such valves are sometimes referred to in the art as "steam valves," "air valves," or "quick vents."

Positioned within the valve chamber 6 between the inlet 7 and outlet 9 is the valve seat 16. Cooperative with this valve seat is a valve member 17 provided with the valve sealing disc 18a which, when moved into engagement with the valve seat 16, will seal passage from the inlet 7 to the outlet 9. The valve member 17 is connected to an actuating pin 18 which is spring loaded by the spring 19 to maintain the valve member 17 in the open position as shown. Pressure on the actuating pin 18 will force the valve member 17 and valve sealing disc 18a into sealing or closing engagement with the valve seat 16. In accordance with the invention, the actuator pin may be operated by any known or conventional temperature actuated control mechanism.

In the embodiment shown, the temperature actuated control mechanism is in the form of a self-contained adjustable operator 20. This may have any known form and construction as, for example, the form and construction of the operator sold by the Flair Manufacturing Corporation of Hauppauge, Long Island, under the designation of VN type or VQ type. In this operator, expansion of a temperature expansible fluid in the temperature sensing and control capsule 21 acting on the metal bellows 22 forces the push rod 23 to engage the actuator pin 18 and push the valve member 17 and valve sealing disc 18a against the valve seat 16 when a predetermined temperature is reached, this temperature being adjustable depending on the degree that the temperature sensing and control capsule 21 is screwed into its housing 24.

Rather than being self-contained in the temperature sensing and control capsule, the temperature expansible fluid may be connected and in communication with this capsule through a standard remote type bulb and flexible capillary tube or other conduit, thus allowing the actual temperature sensing element to be positioned at a more remote location from the radiator.

In operation, the operator 20 is set so as to operate at a predetermined temperature as, for example, 70°F. At temperatures below this temperature, the push rod 23 will remain retracted as will the actuator pin 18, thus leaving the valve member and sealing disc spaced from the valve seat 16. Steam from the supply main may thus pass through the pipe 3 and radiator valve 4 into the radiator 1, forcing air from the radiator through the connection 8, inlet 7, valve seat 16, outlet 9, and through the vent valve 10 which operates in its conventional manner venting the air until the steam enters the chamber 11 heating up the float 13 and causing the same to expand and force the valve member 15 to shut the vent port. The vent valve continues to operate in the conventional manner. As the ambient temperature rises, it raises the temperature in the temperature sensing control capsule, and the push rod 23 is forced toward the valve chamber 6 until it contacts the actuating pin 18 and at the pre-set temperature forces the pin 18 inwardly, closing the valve member 17 and sealing disc 18a against the valve seat 16, thus preventing further air or steam flow into and through the vent valve. This will prevent further flow of steam into the radiator, effectively shutting the radiator off. The radiator will remain off until the temperature drops below the pre-set temperature of the operator 20, thus causing the push rod 23 to retract, allowing the actuator pin 18 to retract and thus opening the valve seat by movement of the valve member and sealing disc away therefrom and allowing further operation of the radiator and the vent valve in its normal manner.

Through the thermostatic operation, there is no interference of backflow of condensate through the radiator valve and pipe 3 and no interference with the normal operation of the vent valve when air or steam is allowed to pass into the same.

As mentioned, a part of the temperature expansible fluid in the temperature sensing and control capsule may be in a conventional remote bulb and flexible conduit connected to the control capsule, thus allowing the radiator to be operative in response to ambient temperature at a somewhat remote location. Such an operator with a remote bulb may, for example, have the construction of the operator sold by the Flair Manufacturing Corporation under the designation VQ.

While the invention has been described in detail with reference to the specific embodiment shown, various changes and modifications that fall within the spirit of the invention and scope of the appended claims will become apparent to the skilled artisan.

What is claimed is:

1. A thermostatic control valve for a one-pipe steam system comprising a vent valve provided with a fitting for connection to a radiator of a one-pipe steam system, means defining a flow passage from said fitting into said vent valve, and a temperature controlled valve for closing said flow passage at a pre-set ambient temperature.

2. A thermostatic control valve according to claim 1, in which said vent valve is connected to a valve chamber having an inlet for connection to a radiator of a one-pipe steam system and an outlet leading into said vent valve, a valve seat between said inlet and outlet, a valve member movably positioned for sealing engagement with said valve seat and a temperature actuated control mechanism for moving said valve member in and out of engagement with said valve seat.

3. A thermostatic control valve according to claim 2, in which said temperature actuated control member is a self-contained mechanism with a fluid chamber containing a heat expansible fluid and means for moving said valve member into sealing engagement with said valve seat upon expansion of said fluid.

4. A thermostatic control valve according to claim 3, in which said temperature actuated control mechanism has means for adjustably varying the temperature at which said valve member is moved into sealing engagement with said valve seat.

5. A thermostatic control valve according to claim 3, including a remote bulb containing a portion of said heat expansible fluid.

6. Thermostatic control valve, according to claim 1, in which said fitting is connected to a radiator of a one-pipe steam system.

* * * * *